United States Patent Office 3,099,685
Patented July 30, 1963

3,099,685
β- AND γ-(POLYFLUOROALKOXY)ALKYL FLUOROACYLATES AND THEIR PREPARATION
William A. Sheppard, Wilmington, Del., assignor to E. I. du Pont de Nemours and Company, Wilmington, Del., a corporation of Delaware
No Drawing. Filed Oct. 23, 1961, Ser. No. 147,077
7 Claims. (Cl. 260—487)

This invention relates to, and has as its principal objects provision of, certain novel fluoroacylates (here fluorinated diesters and/or ether-esters) and a method for the preparation of the same.

The ultimate novel products of this invention are β- and γ-(polyfluoroalkoxy)alkyl fluoroacylates of the formula

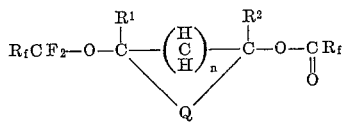

wherein $R_f$ is fluorine, ω-hydroperfluoroalkyl, or perfluoroalkyl; $R^1$ and $R^2$ are hydrogen, alkyl (e.g., methyl, pentyl, octyl and dodecyl), alkenyl (e.g., vinyl and allyl), aryl (e.g., phenyl, tolyl and naphthyl), alkoxy (e.g., ethoxy), aryloxy (e.g., phenoxy), alkoxyalkyl (e.g., methoxymethyl), aryloxyalkyl (e.g., phenoxymethyl), partially halogenated, i.e., at least one halogen and at least one hydrogen, alkyl (e.g., chloromethyl and tetrafluoroethyl), or haloaryl (e.g., p-fluorophenyl); Q is one alkylene (e.g., ethylene, tetramethylene and hexamethylene) or two members of the group consisting of hydrogen, alkyl, alkenyl, aryl, alkoxy, partially halogenated alkyl and haloaryl; and $n$ is a cardinal number of up to one, i.e., 0 or 1. The preferred products of this invention are those of the above formula in which each of the various organic groups contains not over 12 carbon atoms.

These ultimate products may be prepared by either a two-step or a single-step process. In the two-step process, two moles of a fluoroacyl fluoride of the formula

wherein $R_f$ has the meaning defined hereinbefore, are first reacted with one mole of a glycol of the formula

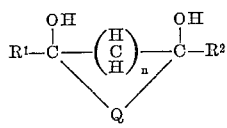

wherein the R's, Q and $n$ have the meanings defined above for the general formula to form novel intermediate bis(fluoroacylate)s of the general formula

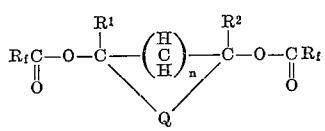

wherein the R's, Q and $n$ have the same meanings as given above.

In the second step of this two-step process, the bis(fluoroacylate) formed in the first step is reacted with sulfur tetrafluoride at an elevated temperature in accordance with the following equation:

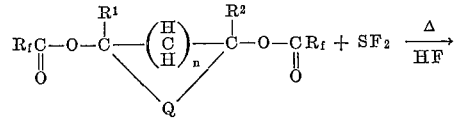

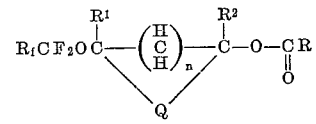

The first step of the two-step process is conveniently carried out in a reaction vessel fitted with an external cooling bath, e.g., a bath composed of a mixture of solid carbon dioxide and acetone, a mechanical stirrer, an addition funnel, a gas inlet tube, and a condenser suitably cooled to condense to a liquid the most volatile components of the reaction mixture, e.g., with a mush made from methanol and liquid nitrogen. The vessel is charged with a mixture of an alkali metal fluoride, e.g., sodium fluoride, to absorb hydrogen fluoride formed as a by-product in the reaction, and an inert organic liquid to serve as a reaction medium, e.g., diethyl ether. After this mixture is cooled to −78° C., excess fluoroacyl fluoride, e.g., carbonyl fluoride, is added to the ether solution and the glycol, e.g., ethylene glycol, is added slowly. An exothermic reaction takes place and as soon as the reaction subsides, the mixture is allowed to warm to room temperature while the excess carbonyl fluoride is returned to the reaction mixture by the reflux condenser. The ether solution of the bis(fluoroacylate), e.g., the glycol bis(fluoroformate) when carbonyl fluoride is used, is filtered from the solid sodium fluoride-hydrogen fluoride adduct and the ether solution is fractionally distilled at a temperature below the decomposition point of the product.

In this first step, the use of a reaction medium is not essential. However, the use of an inert organic liquid such as an ether or halogenated hydrocarbon, e.g., methylene chloride, is convenient. The use of an absorbent for the hydrogen fluoride formed is likewise not essential but it is preferred especially when the reaction is carried out in a glass or glass-lined apparatus. In addition to the alkali metal fluorides, tertiary amines, e.g., triethylamine and pyridine, are also suitable for this purpose. The reaction between the fluoroacyl fluoride and the glycol takes place rapidly at temperatures as low as −78° C. The particular reaction temperature employed is not critical, except that it should not exceed the temperature at which the glycol bis(fluoroacylate) decomposes. The pressure under which the reaction is carried out is not critical, atmospheric pressure being very satisfactory. Reaction vessels constructed of glass (provided an absorbent for hydrogen fluoride is also employed) or of any metal inert to the reaction mixture, e.g., copper, nickel, Monel metal, "Hastelloy", etc., can be used.

The conversion of the glycol bis(fluoroacylate) to the β- or γ-(polyfluoroalkoxy)alkyl fluoroacylate is conveniently carried out by placing a mixture of the glycol bis(fluoroacylate), obtained as in the first step described above, and not necessarily separated from the original reaction mixture, with an excess of sulfur tetrafluoride, e.g., 2 moles of sulfur tetrafluoride per mole of glycol bis(fluoroacylate), and a catalyst comprising a fluoride ion acceptor, e.g., hydrogen fluoride, boron trifluoride, phosphorus pentafluoride, etc., in a closed reaction vessel whose inner surface is made of a material which is resistant to chemical attack by hydrogen fluoride, e.g., the alloy known commercially as "Hastelloy." While higher proportions of sulfur tetrafluoride can be used, they are less desirable since the larger excess of sulfur tetrafluoride tends to produce greater proportions of the bis(polyfluoroalkoxy)alkane. The closed reaction vessel is then agitated and heated to a temperature between 100° and 175° C., preferably at 150–175° C., under the autogenous pressure developed under the reaction conditions. Reaction times of 1–10 hours or more are satisfactory. However, it is preferred to employ reaction times of about 10 hours in order to insure more complete reaction. The reaction products are isolated from the cooled reaction mixture by conventional means, e.g., by fractional distillation. This sulfur tetrafluoride reaction is described in greater detail in U.S. Patent 2,859,245 to W. C. Smith.

The use of a solvent or reaction medium in the second step of this process is not essential; if desired, however, an inert solvent can be used. Suitable solvents include hydrocarbons, e.g., benzene, hexane, cyclohexane and perfluorinated hydrocarbons, e.g., perfluorocyclohexane.

The reactants used in the two-step process can be of the grades ordinarily available. The reaction should, however, be conducted under substantially anhydrous conditions. Thus, the glycol used in the first step should be substantially anhydrous. Glycols suitable for use in this reaction can be prepared by well-known methods such as hydroxylation of olefinic compounds, hydration of 1,2- and 1,3-epoxides, bimolecular reduction of carbonyl compounds, by reduction of aldols or of 1,2- or 1,3-diketones, etc. (see Wagner and Zook, "Synthetic Organic Chemistry," John Wiley & Sons, Inc., N.Y. (1953), pp. 153, 172, 179). The sulfur tetrafluoride used in the second step can be prepared by methods described in the literature [cf. Brown and Robinson, J. Chem. Soc., 1955, 3147–51, and Tullock, Fawcett, Smith and Coffman, J. Am. Chem. Soc., 82, 539 (1960)].

In the single-step process, the β- and γ-(polyfluoroalkoxy)alkyl fluoroacylates are prepared by reaction of a fluoroacyl fluoride of the formula

where $R_f$ is fluorine, ω-hydroperfluoroalkyl or perfluoroalkyl, with a 1,2- or 1,3-epoxide of the formula

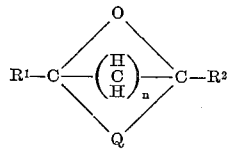

wherein $n$, $R^1$, $R^2$ and Q have the meanings specified above, at a temperature between 50° and 250° C. This reaction is illustrated by the following equation:

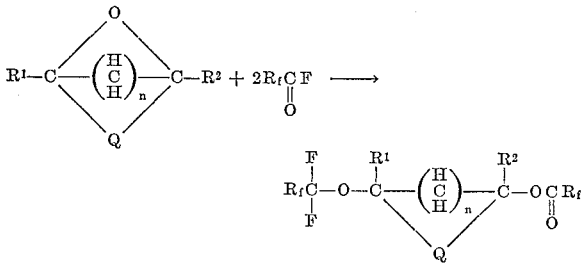

This reaction is conveniently carried out by placing the fluoroacyl fluoride and the epoxide reactants in the desired proportions in a reaction vessel which is capable of withstanding the autogenous pressure developed by the reaction mixture under the operating conditions, and the vessel is closed and heated to a temperature between 50° and 250° C. for time sufficient to obtain substantial reaction of the fluoroacyl fluoride with the epoxide. While the use of a catalyst for this reaction is not essential, it is preferred to employ one such as, for example, a tertiary amine, quaternary ammonium fluoride, an alkali metal fluoride, or hydrogen fluoride, in order to obtain improved yields of the desired β- or γ-(polyfluoroalkoxy)alkyl fluoroacylate. The reaction product is isolated from the reaction mixture by conventional means, e.g., by fractional distillation.

The proportions of the reactants used in this process are not critical. However, since the desired product results from the reaction of two moles of the fluoroacyl fluoride with one mole of the epoxide the most efficient use of the reaction equipment is obtained by using the reactants in this ratio. Higher or lower ratios of fluoroacyl fluoride to epoxide can, however, be used if desired. The excess of one reactant over that required by the stoichiometry of the reaction serves as a reaction medium.

As indicated above, the reaction can be carried out over a wide range of temperatures, i.e., between 50° and 250° C. However, it is preferred to carry out the reaction at a temperature between 75° and 200° C. Under these conditions, the reaction times will range from 0.5 to 14 hours or more. The optimum reaction time depends on the particular reactants and reaction temperatures, and whether a batch or continuous flow process is being employed.

The reaction is conveniently carried out in a closed reaction vessel under the autogenous pressure developed by the reaction mixture under the reaction conditions. This is particularly suitable when low boiling reactants are employed. However, if high boiling fluoroacyl fluorides and epoxides are used, the reaction can be conveniently carried out at atmospheric pressure.

The use of an inert reaction medium in this process is optional. The reaction takes place without any added solvent or reaction medium. However, an inert organic liquid that is a solvent for the reactants or catalyst and is inert to the reactants and reaction products under the reaction conditions can be used if desired. Any reaction medium employed must be free of hydroxyl groups since such groups react with fluoroacyl fluorides. Examples of suitable reaction media include nitriles, e.g., acetonitrile; ethers, e.g., diethyl ether, ethylene glycol dimethyl ether, and dioxane; hydrocarbons, e.g., benzene and octane; halogenated hydrocarbons, e.g., methylene chloride; and the like.

The material of which the reaction vessel is constructed is not critical but it is advantageous to use a vessel which is resistant to attack by any of the components of the reaction mixture, including hydrogen fluoride which would be formed as a result of incidental hydrolysis of the fluoroacyl fluoride. Metals suitable as materials of construction include copper, nickel, Monel metal and nickel-iron-molybdenum alloys, e.g., the alloy known commercially as "Hastelloy."

The reactants used in the one-step process can be of the grades ordinarily available. However, the 1,2- and 1,3-epoxides should be essentially anhydrous as any water present reacts with the fluoroacyl fluoride and thus reduces the amount of this reactant available for reaction with the epoxide. The 1,2- and 1,3-epoxides and the fluoroacyl fluorides are commercially available or they can be made by known methods. For example, the fluoroacyl fluorides can be made by the reaction of carbonyl fluoride with fluoroolefins at 50–250° C. in the presence of a fluoride salt capable of producing fluoride ions [this process is described in coassigned U.S. application Serial No. 64,728, filed October 25, 1960, by F. S. Fawcett], or by reaction of fluorocarboxylic acids with carbonyl fluoride at temperatures of 175–500° C. [This process is described in coassigned U.S. application Serial No. 852,939, filed November 16, 1959, by E. K. Ellingboe, F. S. Fawcett, and C. W. Tullock.] The 1,2- and 1,3-epoxides used in this process can be prepared by well-known methods described in the literature (see, for example, Wagner and Zook, op. cit., p. 253), for instance by action of alkali on halohydrins, by the reaction of peracids on olefinic compounds, etc.

The products and process of this invention are described in further detail in the following examples in which the proportions of ingredients are expressed in parts by weight unless otherwise stated.

EXAMPLE I

*Preparation of 2-(Trifluoromethoxy)Ethyl Fluoroformate From Ethylene Glycol*

(A)

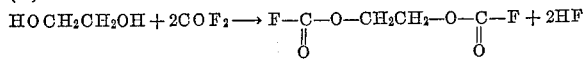

A glass reaction vessel fitted with a mechanical stirrer, an addition funnel, a gas inlet tube and a condenser cooled by a mixture of methanol and liquid nitrogen, is cooled by a mixture of carbon dioxide and acetone, and charged with a mixture of 50 g. of sodium fluoride and 300 ml. of diethyl ether. Carbonyl fluoride (100 g., 1.5 moles) is condensed into the cold ether solution. The gas addition tube is replaced by an addition funnel and 31.0 g. (0.50 mole) of anhydrous ethylene glycol is added dropwise. An exothermic reaction takes place. After the addition of the glycol is complete, the reaction mixture is gradually allowed to warm to room temperature while retaining the excess carbonyl fluoride under reflux for approximately one hour. The ether solution is filtered and the sodium fluoride-hydrogen fluoride solid adduct is washed with ether. The ether solution and washings are combined in a polyethylene bottle and the ether is evaporated under nitrogen at room temperature. The residue of 58 g. of oil is distilled under reduced pressure. There is obtained 56.0 g. (79% of theory) of ethylene bis(fluoroformate), B.P. 36° C./1.7 mm. During this distillation, the pot temperature is held below approximately 70° C. in order to avoid decomposition of the bis (fluoroformate) which may take place above 100° C.

(B)

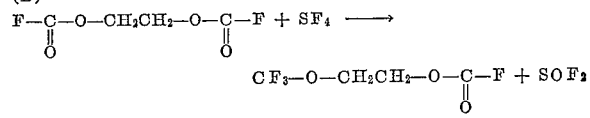

A mixture of 182.5 g. (1.185 moles) of ethylene bis(fluoroformate), 270 g. (2.5 moles) of sulfur tetrafluoride and 30 g. of hydrogen fluoride (1.5 moles) is heated in a reaction vessel capable of withstanding high pressures, lined with "Hastelloy," at 100° C. for 2 hours, at 150° C. for 4 hours, and at 175° C. for 4 hours. The reaction vessel is then cooled and the gaseous products are vented. There is obtained a liquid residue which on distillation gives 6.5 g. of 2-(trifluoromethoxy)ethyl fluoroformate, B.P. 117° C.

*Analysis.*—Calc'd for $C_4H_4F_4O_3$: C, 27.3%; H, 2.29%; F, 43.2%. Found: C, 28.0%; H, 2.63%; F, 43.1%.

The infrared absorption spectrum of this product shows a strong band at 5.41 microns which is due to the presence of the CO of a —COF group and the fluorine nuclear magnetic resonance spectrum shows two peaks in the ratio 3:1 that are attributed to —OCF₃ and —OCOF groups.

*Preparation of 2-(Trifluoromethoxy)Cyclohexyl Fluoroformate*

Examples II–VI describe the reaction of carbonyl fluoride with cyclohexene oxide under various conditions to form 2-(trifluoromethoxy)cyclohexyl fluoroformate in accordance with the following equation:

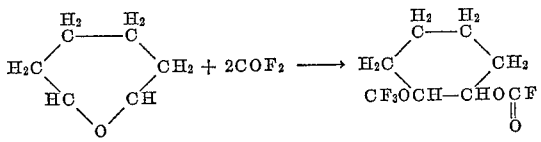

EXAMPLE II

A reaction vessel capable of withstanding high pressures lined with the alloy known commercially as "Hastelloy" and having a capacity of 240 ml. is charged with a mixture of 20 g. of cyclohexene oxide, 2.0 ml. of pyridine and 35 g. of carbonyl fluoride. The closed vessel is heated at 50° C. for 2 hours, 75° C. for 2 hours and at 100° C. for 10 hours. A brown liquid amounting to 42 g. is obtained from the cooled reaction vessel and this is flash distilled at reduced pressure. Redistillation gives 29.8 g. of water-white distillate that becomes turbid on standing, B.P. 52–54° C./4 mm. After filtering through powdered sodium fluoride in a nitrogen atmosphere, this product is redistilled through a 12-inch spinning band column. There is obtained 17.8 g. of 2-(trifluoromethoxy)cyclohexyl fluoroformate, B.P. 50–52° C./3 mm. The fluorine magnetic resonance spectrum obtained on this product shows two peaks, one of unit area in the —OCOF region and another of three units area in the —OCF₃ region. A strong infrared absorption band at 5.45 microns indicates the presence of

*Analysis.*—Calc'd for $C_8H_{10}F_4O_3$: C, 41.75%; H, 4.4%; F, 33.02%. Found: C, 42.23%; H, 4.66%; F, 33.28%.

When the procedure of Example II is repeated using three times the quantities of reagents, there is obtained 102 g. (82% conversion) of 2-(trifluoromethoxy)cyclohexyl fluoroformate, B.P. 34–37° C./1–2 mm.

EXAMPLE III

The procedure of Example II is repeated with a single exception that only 15 g. of carbonyl fluoride is used and there is obtained 32 g. of crude, liquid product. After preliminary distillation, a fractional distillation in a spinning band column gives 3.50 g. of colorless liquid, B.P. 38–41.5° C./27 mm. This fraction is identified as unreacted cyclohexene oxide by comparison of its infrared absorption spectrum with that of authentic starting material. There is also isolated 16 g. of colorless liquid, B.P. 84–85° C./27 mm. which is identified as 2-(trifluoromethoxy)cyclohexyl fluoroformate by the identity of its infrared and fluorine nuclear magnetic resonance spectra in comparison with the spectra of this compound prepared in Example II.

EXAMPLE IV

The procedure of Example II is repeated except that 40 g. of carbonyl fluoride is used with 20 g. of cyclohexene oxide and 0.25 ml. of water is added (to provide hydrogen fluoride as catalyst by the reaction $$COF_2 + H_2O \rightarrow CO_2 + 2HF)$$

There is isolated from the reaction vessel 17 g. of a viscous, white product. The crude product in ether solution exhibits a fluorine nuclear magnetic resonance pattern which has a peak in the —OCOF region and a minor peak in the —OCF₃ region. These indicate that the product contains 2-(trifluoromethoxy)cyclohexyl fluoroformate.

EXAMPLE V

The procedure of Example II is repeated with the exception that 30 ml. of acetonitrile is added initially as a solvent. After a preliminary distillation of the reaction mixture to separate the solvent, distillation through a spinning band column gives 26 g. of 2-(trifluoromethoxy)cyclohexyl fluoroformate, B.P. 38–40° C./1 mm., identified by infrared and fluorine nuclear magnetic resonance spectroscopy.

EXAMPLE VI

A mixture of 20 g. of cyclohexene oxide, 30 ml. of acetonitrile, 2.2 g. of cesium fluoride and 35 g. of carbonyl fluoride in a 240 ml. "Hastelloy"-lined pressure reaction vessel is agitated and heated at 50° C. for 2 hours, at 75° C. for 2 hours, and at 100° C. for 10 hours. The reactor is cooled. The gaseous products are vented and the liquid reaction product amounts to 58 g. of a light brown liquid. Distillation of this crude product gives 8 g. boiling at 26° C./24 mm. to 61° C./8 mm. This fraction on redistillation yields 3.0 g. of colorless 2-(trifluoromethoxy)cyclohexyl fluoroformate, B.P. 65–68° C./28 mm. This product is identified by its infrared and fluorine nuclear magnetic resonance spectra.

EXAMPLE VII

*Preparation of 2-(Trifluoromethoxy)Ethyl Fluoroformate*

A reaction vessel of the type used in Example II is charged with a mixture of 15 g. of ethylene oxide (0.34 mole), 2.0 ml. of pyridine and 60 g. (0.91 mole) of carbonyl fluoride and then heated at 50° C. for 2 hours, at 75° C. for 2 hours, and at 100° C. for 10 hours. The yellow liquid (61 g.) isolated from the cooled reaction vessel is flash-distilled under reduced pressure. Fractional distillation of the distillate through a spinning band column gives 42.4 g. (71% conversion) of 2-(trifluoromethoxy)ethyl fluoroformate, B.P. 56–61° C./97 mm. The fluorine nuclear magnetic resonance spectrum obtained on this product shows a singlet peak of unit area due to the —OCOF and the singlet peak of three units area due to the —OCF$_3$. The infrared absorption spectrum of the product shows a strong band at 5.45 microns due to the carbonyl of —OCOF, as well as a strong band at 3.35 microns due to saturated —CH. The infrared and nuclear magnetic resonance spectra for this product are identical with those of a sample obtained as described in Example I.

*Analysis.*—Calc'd for C$_4$H$_4$O$_3$F$_4$: F, 43.2%. Found: F, 42.60%.

N-phenyl-2-trifluoromethoxyethyl carbamate is prepared from 9.2 g. of 2-(trifluoromethoxy)ethyl fluoroformate and 10 g. of aniline in 100 ml. of ether by refluxing for 0.5 hour, cooling, and washing the ethereal solution with aqueous acid, aqueous bicarbonate, and water. Removal of the ether gives 11.1 g. of white solid anilide. Recrystallization from ethanol-water gives a first crop of 7.40 g., M.P. 56.2–57.5° C. An analytical sample further recrystallized three times from ethanol-water shows a constant M.P. 59.1–60.0° C. The fluorine magnetic resonance spectrum in concentrated ether solution shows only the singlet resonance for OCF$_3$. Characteristic infrared absorptions (KBr wafer) are observed at 3.00$\mu$ (NH), 3.25$\mu$ (=CH), 3.35$\mu$ (saturated CH), 5.85 and 6.45$\mu$ (secondary amide bands) as well as characteristic bands attributed to the aromatic structure at 6.15, 6.20, 6.55, 13.15 and 14.35$\mu$ (monosubstituted aromatic).

*Analysis.*—Calc'd for C$_{10}$H$_{10}$O$_3$NF$_3$: N, 5.62%. Found: N, 5.55%; 5.51% (K).

EXAMPLE VIII

*Preparation of 2-(Pentafluoroethoxy)Ethyl Trifluoroacetate*

A pressure vessel of the type described in Example II is charged with a mixture of 10 g. of ethylene oxide, 1.5 ml. of pyridine, and 58 g. of trifluoroacetyl fluoride. The reactor and its contents are agitated and heated at 75° C. for 2 hours, at 100° C. for 2 hours, and at 125° C. for 10 hours. After cooling the reaction vessel, there is isolated 54 g. of non-volatile product which is subjected to a preliminary distillation and then filtered through a bed of sodium fluoride. The filtered product is then distilled through a spinning band column and there is obtained 25 g. of colorless liquid, B.P. 50° C./34 mm. This product is identified as 2-(pentafluoroethoxy)ethyl trifluoroacetate by nuclear magnetic resonance and infrared absorption spectra and by elemental analysis. The infrared absorption spectrum shows an absorption band at 5.55 microns, and the fluorine nuclear magnetic resonance pattern consists of three peaks in the ratio 3:3:2 that are consistent with the indicated structure.

*Analysis.*—Calc'd for C$_6$H$_4$F$_8$O$_3$: C, 26.10%; H, 1.46%; F, 55.05%. Found: C, 26.64%; H, 1.59%; F, 54.97%.

There is also isolated in this reaction 7 g. of the 1:1 adduct 2-fluoroethyl trifluoroacetate, B.P. 31–35° C./34 mm.

EXAMPLE IX

*Preparation of 2-(Trifluoromethoxy)Ethyl Fluoroformate*

A mixture of 15 g. of ethylene oxide and 60 g. of carbonyl fluoride in a pressure vessel of the type described in Example II is heated at 50° C. for 2 hours, at 75° C. for 2 hours, and at 100° C. for 10 hours. There is obtained 14 g. of yellow liquid which after filtering through sodium fluoride is distilled to give 1.57 g. of colorless liquid, B.P. 47–48° C./95 mm. This product reacts vigorously with aniline to form a solid, and the fluorine n-m-r spectrum shows peaks in the COF and CF region. Further distillation yields 0.77 g. of liquid, B.P. 48° C./95 mm. to 45° C./2 mm. The fluorine nuclear magnetic resonance spectrum pattern for this fraction shows peaks in the —OCOF, —OCF$_3$, and —CF regions; the first two of these indicate the product contains 2-(trifluoromethoxy)ethyl fluoroformate.

EXAMPLE X

*Preparation of 2 - (Chloromethyl)-2(Trifluoromethoxy) Ethyl Fluoroformate and 1-(Chloromethyl)-2-(Trifluoromethoxy)Ethyl Fluoroformate*

A reaction vessel of the type described in Example II is charged with 23.2 g. of epichlorhydrin, 0.8 g. of pyridine and 35 g. of carbonyl fluoride. The closed vessel is then heated at 50° C. for 2 hours, at 75° C. for 2 hours, and at 100° C. for 6 hours. On cooling the reaction vessel there is isolated 45.3 g. of liquid product. Distillation through a spinning band column yields 33 g. of product boiling at 74.5° C./51–53 mm. The fluorine nuclear magnetic resonance spectrum obtained on this product shows the presence of two sets of —OCF$_3$ and —OCOF groups in the proportions of approximately 2:1 showing the presence of the two isomers 2-(chloromethyl) - 2 - trifluoromethoxy)ethyl fluoroformate and 1-(chloromethyl) - 2 - (trifluoromethoxy)ethyl fluoroformate. Redistillation of this mixture gives a central fraction boiling at 66° C./30 mm., and having a refractive index, $n_D^{25}$ of 1.3686.

*Analysis.*—Calc'd for C$_5$H$_5$ClF$_4$O$_3$: C, 26.75%; H, 2.75%; Cl, 15.79%; F, 33.85%. Found: C, 28.87%; H, 2.72%; Cl, 17.63%; F, 31.27%.

The infrared absorption spectrum obtained on this product confirms the above structures.

EXAMPLE XI

*1 - Phenyl - 2 - (Trifluoromethoxy)Ethyl Fluoroformate and/or 2-Phenyl-2-(Trifluoromethoxy)Ethyl Fluoroformate*

A reaction vessel of the type described in Example II is charged with 25 g. of styrene oxide, 1.01 ml. of pyridine and 40 g. of carbonyl fluoride. The closed vessel is heated at 50° C. for 3 hours, and at 75° C. for 10 hours. Upon cooling, there is isolated from the reaction vessel 32 g. of a liquid. This liquid reacts vigorously with aniline to form a solid. The fluorine nuclear magnetic resonance spectrum of the crude reaction product has peaks at the same places for —OCF$_3$ and —OCOF as shown by a reference sample of 2-(trifluoromethoxy) ethyl fluoroformate. The product of this example is therefore believed to be 1-phenyl-2-(trifluoromethoxy) ethyl fluoroformate or 2-phenyl-2-(trifluoromethoxy) ethyl fluoroformate.

EXAMPLE XII

*Preparation of 1 - Phenyl - 2 - (Trifluoromethoxy)Ethyl Fluoroformate and/or 2-Phenyl-2-(Trifluoromethoxy) Ethyl Fluoroformate*

A mixture of 25 g. of styrene oxide, 3 ml. of pyridine and 50 g. of carbonyl fluoride in a pressure vessel of the type described in Example II is heated at 100° C. for 3 hours, and at 135° C. for 10 hours. There is obtained 42 g. of brown liquid product which on simple distillation gives 27 g. of yellow liquid, the bulk of which distills at 68° C./2 mm. Redistillation through a spinning band column gives 15.3 g. of colorless distillate, B.P. 58–61° C./ca. 1 mm., $n_D^{24}$ 1.4381, 1.4423 and 1.4628 (for three fractions). The product is somewhat unstable at room temperature on storage. Infrared and fluorine nuclear magnetic resonance analyses show the product to be 1-phenyl-2-(trifluoromethoxy)ethyl fluoroformate

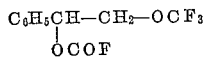

and/or 2-phenyl-2-(trifluoromethoxy)ethyl fluoroformate,

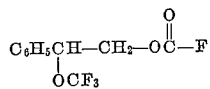

*Analysis.*—Calc'd for $C_{10}H_8F_4O_3$: C, 47.6%; H, 3.17%, F, 30.1%. Found: C, 51.60%, 51.43%; H, 3.63%, 3.70%; F, 31.14%.

The fluorine nuclear magnetic resonance spectrum shows peaks for —OCF$_3$ and —OCOF and the infrared spectrum shows bands at 3.3μ (unsat'd CH), 3.36μ (sat'd CH), 5.45μ (C=O of OCOF), 6.21, 6.27 and 6.67μ (arom. C=C), 8–9μ (CF and/or C—O) and 13.15 and 14.33μ (mono-substituted arom.).

EXAMPLE XIII

*Preparation of 3-(Trifluoromethoxy)Propyl Fluoroformate*

A mixture of 20 g. of trimethylene oxide, 2.5 ml. of pyridine and 50 g. of carbonyl fluoride is charged into a reaction vessel of the type described in Example II and heated at 100° C. for 2 hours, at 125° C. for 2 hours, and at 150° C. for 10 hours to give 47 g. of brown liquid product. A preliminary distillation gives 33 g., B.P. 26–73° C./99 mm., which on redistillation through a spinning band column gives, in addition to low boiling point material (see below), 15.2 g., B.P. 65–78.5° C./100 mm. A central fraction which has a B.P. 76–78° C./100 mm. is identified as 3-(trifluoromethoxy)propyl fluoroformate.

*Analysis.*—Calc'd for $C_5H_6F_4O_3$: C, 31.59%; H, 3.18%; F, 39.98%. Found: C, 32.38%; H, 3.38%; F, 39.75%.

The infrared spectrum shows strong bands at 3.35μ (sat'd CH) and at 5.45μ (C=O) in support of this structure. The fluorine nuclear magnetic resonance spectrum consists of two resonances, one in the —OCF$_3$ region and one in the —OCOF region while the hydrogen nuclear magnetic resonance spectrum contains three resonances for CH$_2$ groups in support of this structure.

Redistillation of the low boiling material (B.P. up to 49° C./135 mm.) gives 2.45 g., B.P. 63–65° C., which is identified by means of elemental, infrared and nuclear magnetic resonance analyses as CF$_3$OCH$_2$CH$_2$CH$_2$F.

*Analysis.*—Calc'd for $C_4H_6F_4O$: C, 32.88%; H, 4.14%; F, 52.02%. Found: C, 33.46%; H, 4.32%; F, 51.52%.

This product is presumably formed by loss of carbon dioxide from the above fluoroformate.

EXAMPLE XIV

*Preparation of 1-(Trifluoromethoxymethyl)Allyl Fluoroformate and/or 2-(Trifluoromethoxy)-3-Butenyl Fluoroformate*

A mixture of 25 g. of butadiene monoepoxide (1,2-epoxy-3-butene), 3.0 ml. of pyridine and 75 g. of carbonyl fluoride in a pressure vessel of the type described in Example II is heated at 75° C. for 2 hours, at 100° C. for 2 hours, and at 125° C. for 10 hours. There is obtained 54 g. of dark colored liquid product which on simple distillation gives 41 g. of pale yellow distillate, B.P. 40–50° C./35 mm. This product is filtered through powdered sodium fluoride and redistilled through a spinning band column to give 32 g. of colorless liquid, B.P. 51–55° C./50 mm.

This product is combined with the corresponding material (62 g.) from another preparation carried out under the same conditions using 35 g. of the epoxide, 4 ml. of pyridine and 100 g. of carbonyl fluoride to give 94 g. of combined material. This liquid is stirred with sodium fluoride for 0.5 hour, filtered, and distilled through a spinning band column. There is obtained 73 g. of colorless liquid, B.P. 51–62° C./50 mm., 65 g. of which has a B.P. of 54–59° C./50 mm.

This product is somewhat unstable on storage at room temperature. Infrared and fluorine nuclear magnetic resonance analyses are consistent with the product being 1-(trifluoromethoxymethyl)allyl fluoroformate,

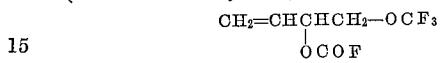

and/or 2-(trifluoromethoxy)-3-butenyl fluoroformate,

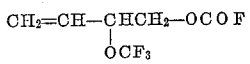

*Analysis.*—Calc'd for $C_6H_6F_4O_3$: C, 35.65%; H, 3.00%; F, 37.58%. Found: C, 38.44%, 38.56%; H, 3.64%, 3.62%; F, 34.70%.

The fluorine nuclear magnetic resonance spectrum shows resonances for —OCF$_3$ and —OCOF and the infrared spectrum shows bands at 3.25μ (unsat'd CH), 3.35μ (sat'd CH), 5.4μ (C=O of —OCOF), 6.05μ (C=C) and 8–9μ (CF and/or C—O).

EXAMPLE XV

*Preparation of 1-Methyl-2-(Trifluoromethoxy)Ethyl Fluoroformate and 2-(Trifluoromethoxy)Propyl Fluoroformate*

A mixture of 20 g. of propylene oxide, 2.0 ml. of pyridine and 60 g. of carbonyl fluoride in a pressure vessel of the type described in Example II is heated at 50° C. for 2 hours, at 75° C. for 2 hours, and at 100° C. for 10 hours to give 61 g. of brown liquid product. Distillation with a Vigreux stillhead gives 50 g. of colorless distillate, B.P. 38–42° C./30 mm. The fluorine nuclear magnetic resonance spectrum shows the presence of two sets of peaks in the —OCOF and in the —OCF$_3$ regions, indicating the presence of a mixture of 1-methyl-2-(trifluoromethoxy)ethyl fluoroformate

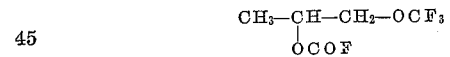

and 2-(trifluoromethoxy)propyl fluoromate

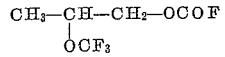

Redistillation of the above material through a spinning band column gives 41 g. of colorless distillate, B.P. 54–60° C./88 mm. The infrared spectra for two of the fractions are essentially identical and show strong bands at 3.3μ (CH) and at 5.45μ (C=O of —OCOF).

*Analysis.*—Calc'd for $C_5H_6F_4O_3$: C, 31.59%; H, 3.19%. Found: C, 32.04%; H, 3.32%.

The examples have illustrated the products and process of this invention by specific reference to certain β- and γ-(polyfluoroalkoxy)alkyl fluoroacylates and to their preparation from certain glycols, 1,2- and 1,3-epoxides and fluoroacyl fluorides. However, this invention includes any fluoroacylate of the formula

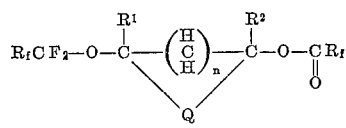

wherein $n$, $R_f$, $R^1$, $R^2$, and Q have the meanings specified hereinbefore. Other products of the invention will be evident from the tables below.

By means of the two-step process, in addition to the specific reactants used to prepare the β-(trifluoromethoxy)ethyl fluoroformate in Example I, other glycols can be reacted with other fluoroacyl fluorides to form glycol 1,2- and 1,3-bis(perfluoroacylates) which in turn can be converted to the β- and γ-(polyfluoroalkoxy)alkyl fluoroacylates by means of sulfur tetrafluoride. Table I lists other specific 1,2- and 1,3-glycols and fluoroacyl fluorides which can be employed in this process to produce the intermediate bis(perfluoroacylates) and ultimate β- and γ-(polyfluoroalkoxy)alkyl fluoroacylates listed in the fourth column of the table.

The β- and γ-(polyfluoroalkoxy)alkyl fluoroacylates of this invention are useful for a variety of purposes. They are particularly useful as intermediates in chemical reactions. For example, the β-(polyfluoroalkoxy)alkyl fluoroacylates can be pyrolyzed at 350–550° C. to polyfluoroalkyl vinyl ethers (this reaction is the subject matter of the copending and coassigned application of Aldrich and Fawcett, Ser. No. 147,076, filed herewith). The β- and γ-(polyfluoroalkoxy)alkyl fluoroacylates of this invention

TABLE I

*Preparation of β- and γ-(Polyfluoroalkoxy)Alkyl Fluoroacylates From Glycols*

| Reactants | | Products of 1st Step | Products of 2nd Step |
|---|---|---|---|
| Glycol | Fluoroacyl Fluoride | | |
| Propylene glycol | Trifluoroacetyl fluoride | Propylene bis (trifluoroacetate). | 2- (Pentafluoroethoxy) propyl trifluoroacetate and 2- (pentafluoroethoxy)-1-methyl-ethyl trifluoroacetate. |
| 1-Phenyl-1,2-ethanediol | do | 1-Phenylethylene bis- (trifluoroacetate). | 2- (Pentafluoroethoxy) -2- phenylethyl trifluoroacetate and 2- (pentafluoroethoxy)- 1 - phenylethyl trifluoroacetate. |
| 1,2-Cyclohexanediol | Perfluoroisobutyryl fluoride. | 1,2 - Bis (perfluoroisobutyroxy) cyclohexane. | 2 - (Perfluoroisobutoxy) cyclohexyl perfluoroisobutyrate. |
| 3-Methoxy-1,2-propanediol | Perfluoro (2-methylbutyryl) fluoride. | 3 - Methoxypropylene bis [perfluoro(2-methylbutyrate)]. | 3 - Methoxy -2- perfluoro (2- methylbutoxy) propyl perfluoro (2-methylbutyrate) and 1-methoxymethyl - 2 - perfluoro - (2 - methylbutoxy) ethyl perfluoro (2-methylbutyrate. |
| 3-Chloro-1,2-propanediol | Carbonyl fluoride | 3 - Chloropropylene bis-(fluoroformate). | 3-Chloro-2- (trifluoromethoxy)-propyl fluoroformate and 1-chloromethyl - 2 - (trifluoromethoxy) ethyl fluoroformate. |
| Trimethylene glycol | do | Trimethylene bis (fluoroformate). | 3- (Trifluoromethoxy) propyl fluoroformate. |
| 3-Phenoxy-1,2-propanediol | Perfluoro (2-methylbutyryl) fluoride. | 1 - (Phenoxymethyl) ethylene bis [perfluoro (2-methylbutyrate)]. | 3- Phenoxy-2-perfluoro (2-methylbutoxy) propyl perfluoro (2-methylbutyrate) and 1-phenoxy-methyl-2-perfluoro (2-methylbutoxy)-ethyl perfluoro (2-methylbutyrate). |
| 1,3-Pentanediol | Trifluoroacetyl fluoride | 1, 3-Pentanediol bis- (trifluoroacetate). | 3- (Pentafluoroethoxy) pentyltrifluoroacetate and/or 1-ethyl-3- (pentafluoroethoxy) - propyl trifluoroacetate. |
| 1,2-Dodecanediol | Carbonyl fluoride | 1, 2-Dodecanediol bis- (fluoroformate). | 2- (Trifluoromethoxy) dodecyl fluoroformate and 1- (trifluoromethoxymethyl) undecyl fluoroformate. |
| 1,2-Cyclobutanediol | do | 1, 2-Cyclobutanediol bis (fluoroformate). | 2- (Trifluoromethoxy) cyclobutyl fluoroformate. |
| Ethylene glycol | ω - Hydroperfluorovaleryl fluoride. | Ethylene bis (ω-hydroperfluorovalerate). | 2-(ω- Hydroperfluoroamyloxy)-ethyl ω -hydroperfluorovalerate. |

Examples of other products of this invention preparable by means of the one-step process are listed in the third column of the following Table II. The specific epoxides and fluoroacyl fluorides from which these compounds are prepared are listed in the first two columns of the table.

are also useful as solvents for dissolving fluorinated polymers to give solutions that are useful in treating porous cellulosic products to render them water-repellent. This use is illustrated by the following examples:

A low melting polymer of tetrafluoroethylene (0.05 g.) is dissolved in 3 cc. of 2-(trifluoromethoxy)-cyclohexyl

TABLE II

*Preparation of β- and γ-(Polyfluoroalkoxy)Alkyl Fluoroacylates*

| Reactants | | Products |
|---|---|---|
| Epoxide | Fluoroacyl Fluoride | |
| Propylene oxide | Pentafluoropropionyl fluoride | 2-(Heptafluoropropoxy)propyl pentafluoropropionate and 2-(heptafluoropropoxy)-1-methyl-ethyl pentafluoropropionate. |
| Styrene oxide | Heptafluorobutyryl fluoride | 2-(Nonafluorobutoxy)-2-phenylethyl heptafluorobutyrate and 2-(nonafluorobutoxy)-1-phenylethyl heptafluorobutyrate. |
| Epichlorhydrin | Trifluoroacetyl fluoride | 2-Chloromethyl-2-(pentafluoroethoxy)ethyl trifluoroacetate and 1-chloromethyl-2-(pentafluoroethoxy)ethyl trifluoroacetate. |
| Cyclohexene oxide | Heptafluoroisobutyryl fluoride | 2-(Nonafluoroisobutoxy)cyclohexyl heptafluoroisobutyrate. |
| 1,2-Epoxydodecane | Carbonyl fluoride | 2-(Trifluoromethoxy)dodecyl fluoroformate and 1-(trifluoromethoxymethyl)undecyl fluoroformate. |
| 1,2-Epoxy-3-methoxypropane | Perfluoro-2-methylbutyryl fluoride. | 3-Methoxy-2-perfluoro(2-methylbutoxy)propyl perfluoro(2-methylbutyrate and 1 -methoxymethyl - 2 - perfluoro (2-methylbutoxy)ethyl perfluoro(2-methylbutyrate). |
| Glycidyl phenyl ether | do | 1-Phenoxymethyl-2-perfluoro(2-methylbutoxy)ethyl perfluoro(2-methylbutyrate) and 3-phenoxy-2-perfluoro(2-methylbutoxy)propyl perfluoro (2-methylbutyrate). |
| Ethylene oxide | Perfluoropivaloyl fluoride | 2-(Perfluoroneopentoxy)ethyl perfluoropivaloate. |
| Do | ω-Hydroperfluorovaleryl fluoride | 2-(ω-Hydroperfluoroamyloxy)ethyl ω-hydroperfluorovalerate. |
| α-Ethyltrimethylene oxide | Trifluoroacetyl fluoride | 3-(Pentafluoroethoxy)pentyl trifluoroacetate and/or 1-ethyl-3-(pentafluoroethoxy)propyl trifluoroacetate. | fluoroformate (prepared as in Example II) by heating on a steam bath. A piece of filter paper is immersed in this solution and then after allowing to dry in air, the paper is not wetted by water, whereas a control piece of filter paper (and also one treated only with the solvent) immediately soaks up water to become limp. Similarly, 4 cc. of β-(trifluoromethoxy)ethyl fluoroformate dissolves 0.05 g. of the polymer when heated on a steam bath, and this solution similarly makes porous filter paper water-repellent; and 3 cc. of β-(pentafluoroethoxy)ethyl trifluoroacetate dissolves 0.05 g. of the polymer at steam bath temperature and the solution makes filter paper quite resistant to wetting by water.

Since obvious modifications and equivalents in the invention will be evident to those skilled in the chemical arts, I propose to be bound solely by the appended claims.

The embodiments of the invention in which an exclusive property or privilege is claimed are defined as follows:

1. A fluoroacylate of the formula

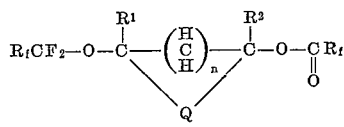

wherein: $R_f$ is selected from the group consisting of fluorine, ω-hydroperfluoroalkyl, and perfluoroalkyl; $R^1$ and $R^2$ are selected from the group consisting of hydrogen, alkyl, alkenyl, aryl, alkoxy, aryloxy, haloalkyl and haloaryl; Q is selected from the group consisting of one alkylene and two members of the group consisting of hydrogen, alkyl, alkenyl, aryl, alkoxy, aryloxy, haloalkyl and haloaryl; and $n$ is a cardinal number of up to 1.

2. 2-(trifluoromethoxy)ethyl fluoroformate.

3. 2-(trifluoromethoxy)cyclohexyl fluoroformate.
4. 2-(pentafluoroethoxy)ethyl trifluoroacetate.
5. 3-(trifluoromethoxy)propyl fluoroformate.
6. The two-step process of preparing a fluoroacylate which comprises (1) reacting two moles of a fluoroacyl fluoride of the formula

with one mole of a glycol of the formula

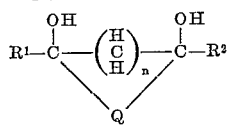

$R_f$, $R^1$, $R^2$, Q and $n$ being as in claim 1, and (2) contacting the resultant product with sulfur tetrafluoride.

7. The process which comprises (1) reacting two moles of carbonyl fluoride with one mole of ethylene glycol and (2) contacting the resultant product with sulfur tetrafluoride.

References Cited in the file of this patent

UNITED STATES PATENTS 2,397,630 Strain _____ Apr. 2, 1946

FOREIGN PATENTS 561,785 Canada _____ Aug. 12, 1958

OTHER REFERENCES

Saunders et al.: Journal Chemical Society (London), 1948, pages 1773–1779 (page 1779 particularly relied upon).